Patented July 25, 1944

2,354,230

UNITED STATES PATENT OFFICE 2,354,230

CHLOROMETHYL SULPHIDE

Lewis A. Walter, East Orange, N. J., assignor to
The Maltbie Chemical Company, Newark, N. J.,
a corporation of New Jersey No Drawing. Application February 28, 1942,
Serial No. 432,886

4 Claims. (Cl. 260—609)

The present invention relates to new and useful compositions of matter comprising a series of organic compounds which I have designated chloromethyl sulphides, according to what I believe to be the accepted method of nomenclature; but which might also be described correctly as thiomethylene chlorides. These compounds have the formula RSCH₂Cl wherein R represents a saturated hydrocarbon group containing more than three but not more than eight carbon atoms, and in which it is to be understood that R has a carbon atom attached directly to the sulphur of the thiomethylene group. In these compounds, R may be a straight chain group, or it may be a branched chain group; and it is also to be understood that the hydrocarbon group, R, may be a primary group, or a group in which the carbon atom that is bonded to the sulphur (of the thiomethylene group) is attached to more than one other carbon atom (of the hydrocarbon group), such as is the case in secondary or tertiary hydrocarbon groups.

These novel compounds have been found to be useful intermediates, and may be applied with advantage in organic syntheses for the purpose of introducing the RSCH₂-group into organic molecules, as, for example, in the preparation of substituted malonic esters.

Cholormethyl sulphides having the above general formula have been prepared by reacting the appropriate mercaptan with trioxylmethylene and dry hydrogen chloride gas under conditions which are fully illustrated in the examples given below.

The following specific examples are illustrative of the novel compounds and their preparation according to my invention. In the examples given, the compounds are colorless, foul-smelling liquids.

EXAMPLE 1

*n-Butylchloromethyl sulphide*

CH₃CH₂CH₂CH₂SCH₂Cl     (1)

One mole of n-butyl mercaptan and 0.367 mole of paraformaldehyde (trioxymethylene) are stirred and chilled in an ice-salt bath and dry hydrogen chloride gas passed into the mixture. As soon as the paraformaldehyde is dissolved, the cooling bath is removed and the dry hydrogen chloride gas passed through the mixture for several hours at room temperature. The aqueous layer of the reacted mixture is separated therefrom and the remaining oil dried by contact with anhydrous calcium chloride. The oil is separated from the drying agent by filtration and fractionally distilled to yield n-butylchloromethyl sulphide, boiling at approximately 64–66° C. (uncorrected) at a pressure of about 16 mm. of mercury.

EXAMPLE 2

*Cyclohexylchloromethyl sulphide*

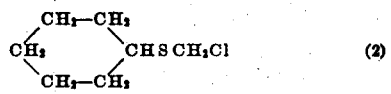

One mole of cyclohexyl mercaptan and 0.367 mole of paraformaldehyde (trioxymethylene) are stirred and chilled in an ice-salt bath and dry hydrogen chloride gas is passed into the mixture. As soon as the paraformaldehyde is dissolved, the cooling bath is removed and the dry hydrogen chloride gas passed through the mixture for several hours at room temperature. The aqueous layer of the reacted mixture is separated therefrom, and the remaining oil dried by contact with anhydrous calcium chloride. The oil is separated from the drying agent by filtration and fractionally distilled to yield cyclohexylchloromethyl sulphide, boiling at approximately 101–103° C. (uncorrected) at a pressure of about 13.5 mm. of mercury.

EXAMPLE 3

*Tertiary butylchloromethyl sulphide*

(CH₃)₃CSCH₂Cl     (3)

One mole of tertiary butyl mercaptan and 0.367 mole of paraformaldehyde (trioxymethylene) are stirred and chilled in an ice-salt bath and dry hydrogen chloride gas is passed into the mixture. As soon as the paraformaldehyde is dissolved, the cooling bath is removed and the dry hydrogen chloride gas is passed through the mixture for several hours at room temperature. The aqueous layer of the reacted mixture is separated therefrom and the remaining oil dried by contact with anhydrous calcium chloride. The oil is separated from the drying agent by filtration and fractionally distilled to yield tertiary butylchloromethyl sulphide, boiling at approximately 57–58° C. (uncorrected) at a pressure of about 12 mm. of mercury.

The substituent group R, as it has been described and defined above, may be widely varied within those limits; and among the derivatives specifically included in the invention are the following which are given as illustrative examples:

| Chloromethyl sulphide (RSCH₂Cl) wherein R is— | Formula | Approximate boiling point, °C. (uncorrected) | Pressure (approx.) (mm. of mercury) |
|---|---|---|---|
| n-Butyl | CH₃CH₂CH₂CH₂SCH₂Cl | 64–66 | 16 |
| Isobutyl | (CH₃)₂CHCH₂SCH₂Cl | 160–161 | (¹) |
| Secondary-butyl | CH₃CH₂CH(CH₃)SCH₂Cl | 58–59 | 11 |
| Tertiary-butyl | (CH₃)₃CSCH₂Cl | 57–58 | 12 |
| 1-methylbutyl | CH₃CH₂CH₂CH(CH₃)SCH₂Cl | 73–76 | 13 |
| n-Amyl | CH₃CH₂CH₂CH₂CH₂SCH₂Cl | 170–176 | (¹) |
| Isoamyl | (CH₃)₂CHCH₂CH₂SCH₂Cl | 91–93 | 30 |
| n-Hexyl | CH₃CH₂CH₂CH₂CH₂CH₂SCH₂Cl | 105–106 | 22 |
| Cyclohexyl | C₆H₁₁SCH₂Cl | 101–103 | 13.5 |
| 2-ethylbutyl | CH₃CH₂CH(C₂H₅)CH₂SCH₂Cl | 87–88 | 9 |
| 1-methylheptyl | CH₃(CH₂)₅CH(CH₃)SCH₂Cl | 50–53 | 1.5 |

¹ Atmospheric.

In the foregoing examples, the boiling points are approximate, and at about the pressures given; but are the boiling points which I actually observed, according to a procedure believed to be reliable.

The examples given above, and illustrative processes for their production, include the best embodiments of my present invention now known to me; but it is to be understood that the invention is not necessarily or specifically limited thereto and may, under proper conditions, have other embodiments, produced in other ways, without departure from the spirit of the invention, and within the scope of the following claims.

I claim:

1. As a new and useful compound: a chloromethyl sulphide having the formula:

RSCH₂Cl wherein R represents a saturated hydrocarbon group containing more than three but not more than eight carbon atoms, and has a secondary carbon atom attached directly to the sulphur of the thiomethylene group.

2. 1-methylbutyl chloromethyl sulphide.
3. Secondary-butyl chloromethyl sulphide.
4. Cyclohexyl chloromethyl sulphide.

LEWIS A. WALTER.